(12) United States Patent
Vallius

(10) Patent No.: US 10,241,332 B2
(45) Date of Patent: Mar. 26, 2019

(54) REDUCING STRAY LIGHT TRANSMISSION IN NEAR EYE DISPLAY USING RESONANT GRATING FILTER

(71) Applicant: Microsoft Technology Licensing, LLC, Redmond, WA (US)

(72) Inventor: Tuomas Vallius, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 95 days.

(21) Appl. No.: 14/878,727

(22) Filed: Oct. 8, 2015

(65) Prior Publication Data

US 2017/0102544 A1 Apr. 13, 2017

(51) Int. Cl.
*G02B 27/01* (2006.01)
*G02B 6/124* (2006.01)
(Continued)

(52) U.S. Cl.
CPC ....... *G02B 27/0172* (2013.01); *G02B 5/1819* (2013.01); *G02B 5/1842* (2013.01);
(Continued)

(58) Field of Classification Search
CPC .............. G02B 27/0172; G02B 5/1842; G02B 27/1086
(Continued)

(56) References Cited

U.S. PATENT DOCUMENTS 3,980,883 A  9/1976 Franks
4,711,512 A * 12/1987 Upatnieks .......... G02B 27/0103
345/7

(Continued)

FOREIGN PATENT DOCUMENTS

CN   100433043 C   10/2007
CN   102902060 A    1/2013
(Continued)

OTHER PUBLICATIONS

"International Search Report and Written Opinion Issued in PCT Application No. PCT/US2016/052405", dated Dec. 21, 2016, (10 Pages total).
Platte, et al, "Optically Induced Mask-Controlled Time-Variable Periodic Microwave Structures", In IEEE Transactions on Microwave Theory and Techniques, vol. 48, Issue 5, May 2000, (6 pages total).
Srinivasan, Pradeep, "Design and Fabrication of Space Variant Micro Optical Elements", In Doctoral Dissertation, Retrieved on: Nov. 27, 2014, Available at: http://etd.fcla.edu/CF/CFE0002843/Srinivasan_Pradeep_200908_PhD.pdf (160 pages total).
(Continued)

*Primary Examiner* — Benyam Ketema
(74) *Attorney, Agent, or Firm* — Mark K. Young; Mayer & Williams PC

(57) ABSTRACT

A near eye optical display system comprising a waveguide and diffractive optical elements (DOEs) for in-coupling, exit pupil expansion, and out-coupling reduces the transmission of stray light in the system using a doubly-periodic surface relief microstructure that combines a guided-mode resonant filter with Bragg reflectance. Such resonant grating filter may be configured with grooves and/or ridges of different widths that are located on the waveguide that have respective sub-periods that match Bragg reflectance periods for particular wavelengths. The interaction of the sub-periods gives rise to a photonic band gap effect in which the resonant grating's effective refractive index is modulated to increase angular sensitivity and wavelength bandwidth of the resonant grating filter. The sub-periods define an overall period (i.e., a super period) for the resonant grating filter by which incident light is coupled into the waveguide, guided, and then coupled out of the waveguide at the side of incidence.

5 Claims, 12 Drawing Sheets

(51) Int. Cl.

| | | |
|---|---|---|
| *G02B 6/34* | (2006.01) | |
| *G02B 27/00* | (2006.01) | |
| *G02B 5/18* | (2006.01) | |
| *F21V 8/00* | (2006.01) | |
| *G02B 27/42* | (2006.01) | |
| *G02B 6/122* | (2006.01) | |
| *G02B 27/10* | (2006.01) | |
| *G02B 6/00* | (2006.01) | |

(52) U.S. Cl.
CPC ......... *G02B 5/1861* (2013.01); *G02B 5/1866* (2013.01); *G02B 6/00* (2013.01); *G02B 6/005* (2013.01); *G02B 6/0016* (2013.01); *G02B 6/0026* (2013.01); *G02B 6/0038* (2013.01); *G02B 6/124* (2013.01); *G02B 6/1225* (2013.01); *G02B 6/34* (2013.01); *G02B 27/0081* (2013.01); *G02B 27/1086* (2013.01); *G02B 27/4205* (2013.01); *G02B 27/4272* (2013.01); *G02B 2027/014* (2013.01); *G02B 2027/0118* (2013.01); *G02B 2027/0125* (2013.01); *G02B 2027/0178* (2013.01)

(58) Field of Classification Search
USPC .............................................................. 345/8
See application file for complete search history.

(56) References Cited

U.S. PATENT DOCUMENTS

| | | | |
|---|---|---|---|
| 4,743,083 A * | 5/1988 | Schimpe | G02B 6/124 257/E31.065 |
| 5,061,025 A | 10/1991 | Debesis | |
| 5,218,471 A | 6/1993 | Swanson et al. | |
| 5,224,198 A | 6/1993 | Jachimowicz | |
| 5,340,637 A | 8/1994 | Okai et al. | |
| 5,532,736 A * | 7/1996 | Kuriki | H04N 7/144 348/14.16 |
| 5,751,388 A | 5/1998 | Larson | |
| 5,907,427 A | 5/1999 | Scalora et al. | |
| 6,046,541 A | 4/2000 | Valliath | |
| 6,140,980 A | 10/2000 | Spitzer et al. | |
| 6,147,725 A * | 11/2000 | Yuuki | G02B 6/0036 349/61 |
| 6,232,044 B1 | 5/2001 | Gibbons et al. | |
| 6,259,561 B1 | 7/2001 | George et al. | |
| 6,410,213 B1 | 6/2002 | Raguin | |
| 6,580,529 B1 * | 6/2003 | Amitai | G02B 5/32 359/13 |
| 6,587,619 B1 * | 7/2003 | Kinoshita | H01S 5/12 385/37 |
| 6,700,552 B2 | 3/2004 | Kollin et al. | |
| 6,833,956 B2 | 12/2004 | Lee | |
| 6,836,365 B2 | 12/2004 | Goto | |
| 6,873,463 B2 | 3/2005 | Nakai | |
| 6,909,546 B2 | 6/2005 | Hirai | |
| 6,950,227 B2 | 9/2005 | Schrader | |
| 6,990,275 B2 | 1/2006 | Kersten et al. | |
| 7,123,415 B2 | 10/2006 | Mercer | |
| 7,129,028 B2 | 10/2006 | Koeda et al. | |
| 7,224,854 B2 | 5/2007 | Ellwood, Jr. | |
| 7,236,251 B2 | 6/2007 | Takaoka | |
| 7,339,738 B1 | 3/2008 | Carr | |
| 7,391,524 B1 | 6/2008 | Chen et al. | |
| 7,483,604 B2 | 1/2009 | Levola | |
| 7,492,512 B2 * | 2/2009 | Niv | G02B 23/18 359/407 |
| 7,492,517 B2 | 2/2009 | McGrew | |
| 7,525,672 B1 | 4/2009 | Chen et al. | |
| 7,565,041 B2 | 7/2009 | Little et al. | |
| 7,573,640 B2 | 8/2009 | Nivon et al. | |
| 7,576,866 B2 | 8/2009 | Ohkubo | |
| 7,627,018 B1 | 12/2009 | Guilfoyle | |
| 7,710,628 B2 | 5/2010 | Morizono et al. | |
| 7,719,675 B2 | 5/2010 | Grygier et al. | |
| 7,738,746 B2 | 6/2010 | Charters et al. | |
| 7,959,308 B2 | 6/2011 | Freeman et al. | |
| 7,981,591 B2 | 7/2011 | Li et al. | |
| 8,135,227 B2 | 3/2012 | Lewis et al. | |
| 8,152,307 B2 | 4/2012 | Duelli et al. | |
| 8,160,411 B2 | 4/2012 | Levola et al. | |
| 8,208,191 B2 | 6/2012 | Gan et al. | |
| 8,233,204 B1 | 7/2012 | Robbins | |
| 8,314,993 B2 | 11/2012 | Levola | |
| 8,320,032 B2 | 11/2012 | Levola | |
| 8,376,548 B2 | 2/2013 | Schultz | |
| 8,463,080 B1 | 6/2013 | Anderson et al. | |
| 8,466,953 B2 * | 6/2013 | Levola | G02B 27/0081 348/51 |
| 8,482,859 B2 | 7/2013 | Border et al. | |
| 8,488,246 B2 | 7/2013 | Border et al. | |
| 8,508,848 B2 * | 8/2013 | Saarikko | G02B 5/1814 359/567 |
| 8,547,638 B2 | 10/2013 | Levola | |
| 8,548,290 B2 | 10/2013 | Travers | |
| 8,579,492 B2 | 11/2013 | Epstein et al. | |
| 8,593,734 B2 | 11/2013 | Laakkonen | |
| 8,675,182 B2 | 3/2014 | Bamji | |
| 8,681,184 B2 | 3/2014 | Seesselberg | |
| 8,699,137 B2 | 4/2014 | McGrew | |
| 8,736,963 B2 | 5/2014 | Robbins et al. | |
| 8,749,796 B2 | 6/2014 | Pesach et al. | |
| 8,792,169 B2 | 7/2014 | Jiang et al. | |
| 8,830,584 B2 | 9/2014 | Saarikko | |
| 8,903,207 B1 | 12/2014 | Brown et al. | |
| 9,239,471 B2 | 1/2016 | Zalevsky et al. | |
| 9,341,846 B2 | 5/2016 | Opovich et al. | |
| 9,671,615 B1 | 6/2017 | Vallius | |
| 9,864,208 B2 | 1/2018 | Vallius et al. | |
| 9,910,276 B2 | 3/2018 | Vallius et al. | |
| 9,927,614 B2 | 3/2018 | Vallius | |
| 9,946,072 B2 | 4/2018 | Vallius | |
| 10,038,840 B2 | 7/2018 | Vallius | |
| 10,073,278 B2 | 9/2018 | Vallius | |
| 2001/0015851 A1 | 8/2001 | Danziger | |
| 2001/0033716 A1 | 10/2001 | Fukutomi | |
| 2001/0036012 A1 | 11/2001 | Nakai | |
| 2002/0080491 A1 | 6/2002 | Goto | |
| 2003/0107787 A1 | 6/2003 | Bablumyan | |
| 2004/0062502 A1 * | 4/2004 | Levola | G02B 5/1866 385/129 |
| 2004/0071180 A1 * | 4/2004 | Wang | H01S 3/1055 372/102 |
| 2004/0170356 A1 | 9/2004 | Iazikov | |
| 2004/0184147 A1 | 9/2004 | Parikka | |
| 2004/0218172 A1 | 11/2004 | DeVerse et al. | |
| 2004/0233534 A1 * | 11/2004 | Nakanishi | G02B 5/1809 359/572 |
| 2005/0002611 A1 * | 1/2005 | Levola | G02B 6/105 385/37 |
| 2005/0180674 A1 | 8/2005 | Ellwood, Jr. | |
| 2005/0189315 A1 | 9/2005 | Knight et al. | |
| 2006/0056028 A1 | 3/2006 | Wildnauer | |
| 2006/0132914 A1 * | 6/2006 | Weiss | G02B 5/32 359/462 |
| 2006/0221448 A1 * | 10/2006 | Nivon | G02B 5/1814 359/572 |
| 2007/0008624 A1 * | 1/2007 | Hirayama | G02B 27/0081 359/630 |
| 2007/0188837 A1 | 8/2007 | Shimizu et al. | |
| 2007/0201795 A1 | 8/2007 | Rice et al. | |
| 2007/0242253 A1 | 10/2007 | Visser et al. | |
| 2007/0291362 A1 | 12/2007 | Hill | |
| 2008/0043334 A1 * | 2/2008 | Itzkovitch | G02B 5/1814 359/569 |
| 2008/0138013 A1 | 6/2008 | Parriaux | |
| 2008/0212921 A1 | 9/2008 | Gaylord | |
| 2008/0297731 A1 | 12/2008 | Powell et al. | |
| 2009/0009486 A1 | 1/2009 | Sato | |
| 2009/0040607 A1 | 2/2009 | Amako | |
| 2009/0128911 A1 | 5/2009 | Itzkovitch et al. | |
| 2009/0180166 A1 | 7/2009 | Hefetz et al. | |

(56) References Cited

U.S. PATENT DOCUMENTS

| | | | |
|---|---|---|---|
| 2009/0245730 A1 | 10/2009 | Kleemann | |
| 2009/0257106 A1 | 10/2009 | Tan | |
| 2009/0303599 A1 | 10/2009 | Levola | |
| 2010/0079865 A1* | 4/2010 | Saarikko | G02B 6/0016 359/566 |
| 2010/0134534 A1* | 6/2010 | Seesselberg | G02B 6/0038 345/690 |
| 2010/0149073 A1 | 6/2010 | Chaum et al. | |
| 2010/0177388 A1 | 7/2010 | Cohen et al. | |
| 2010/0201953 A1 | 8/2010 | Freeman et al. | |
| 2010/0231693 A1 | 9/2010 | Levola | |
| 2010/0232016 A1 | 9/2010 | Landa | |
| 2010/0277803 A1* | 11/2010 | Pockett | G02B 27/0172 359/567 |
| 2010/0284085 A1 | 11/2010 | Laakkonen | |
| 2010/0296163 A1 | 11/2010 | Saarikko | |
| 2010/0315719 A1 | 12/2010 | Saarikko | |
| 2010/0321781 A1* | 12/2010 | Levola | G02B 27/0081 359/569 |
| 2011/0002143 A1 | 1/2011 | Saarikko et al. | |
| 2011/0019874 A1* | 1/2011 | Jarvenpaa | G06F 3/013 382/103 |
| 2011/0038049 A1* | 2/2011 | Vallius | G02B 5/1809 359/575 |
| 2011/0096401 A1 | 4/2011 | Levola | |
| 2011/0115733 A1 | 5/2011 | Shih | |
| 2011/0261366 A1 | 10/2011 | Tearney | |
| 2012/0019647 A1 | 1/2012 | Kempe et al. | |
| 2012/0075168 A1 | 3/2012 | Osterhout et al. | |
| 2012/0120365 A1 | 5/2012 | Legerton | |
| 2012/0224062 A1 | 9/2012 | Lacoste | |
| 2013/0051730 A1 | 2/2013 | Travers | |
| 2013/0077049 A1 | 3/2013 | Bohn | |
| 2013/0100362 A1 | 4/2013 | Saeedi et al. | |
| 2013/0135193 A1 | 5/2013 | Fike, III | |
| 2013/0222384 A1 | 8/2013 | Futterer | |
| 2013/0242392 A1 | 9/2013 | Amirparviz et al. | |
| 2013/0250430 A1 | 9/2013 | Robbins et al. | |
| 2013/0261782 A1 | 10/2013 | Becken | |
| 2013/0314793 A1 | 11/2013 | Robbins | |
| 2013/0322810 A1 | 12/2013 | Robbins | |
| 2014/0002608 A1 | 1/2014 | Atwell | |
| 2014/0043689 A1 | 2/2014 | Mason | |
| 2014/0064655 A1 | 3/2014 | Nguyen et al. | |
| 2014/0104665 A1 | 4/2014 | Popovich et al. | |
| 2014/0140654 A1 | 5/2014 | Brown et al. | |
| 2014/0168167 A1 | 6/2014 | Chou | |
| 2014/0168260 A1 | 6/2014 | O'Brien et al. | |
| 2014/0185142 A1 | 7/2014 | Gupta et al. | |
| 2014/0217385 A1 | 8/2014 | Gaertner et al. | |
| 2014/0240613 A1 | 8/2014 | Bohn et al. | |
| 2014/0240834 A1* | 8/2014 | Mason | G02B 27/0081 359/567 |
| 2014/0240843 A1 | 8/2014 | Kollin | |
| 2014/0293434 A1 | 10/2014 | Cheng | |
| 2014/0300695 A1 | 10/2014 | Smalley et al. | |
| 2015/0034591 A1 | 2/2015 | Vink | |
| 2015/0083917 A1 | 3/2015 | Wyrwas | |
| 2015/0092042 A1 | 4/2015 | Fursich | |
| 2015/0108337 A1 | 4/2015 | Goodwin | |
| 2015/0108479 A1 | 4/2015 | Brinkley | |
| 2015/0185475 A1 | 7/2015 | Saarikko | |
| 2015/0234477 A1 | 8/2015 | Abovitz | |
| 2015/0234491 A1 | 8/2015 | Liu | |
| 2015/0277116 A1 | 10/2015 | Richards | |
| 2015/0331544 A1 | 11/2015 | Bergstrom | |
| 2015/0355394 A1 | 12/2015 | Valera | |
| 2015/0382465 A1 | 12/2015 | Steyn | |
| 2016/0018637 A1 | 1/2016 | Sparks | |
| 2016/0026253 A1 | 1/2016 | Bradski | |
| 2016/0116739 A1 | 4/2016 | TeKolste | |
| 2016/0231478 A1* | 8/2016 | Kostamo | G02B 5/1857 |
| 2016/0231566 A1* | 8/2016 | Levola | G02B 27/0172 |
| 2016/0231570 A1 | 8/2016 | Levola | |
| 2016/0234485 A1 | 8/2016 | Robbins | |
| 2016/0291405 A1 | 10/2016 | Frisken | |
| 2016/0327789 A1 | 11/2016 | Klug | |
| 2016/0334635 A1 | 11/2016 | Ushigome | |
| 2017/0003504 A1* | 1/2017 | Vallius | G02B 27/0101 |
| 2017/0003505 A1 | 1/2017 | Vallius | |
| 2017/0031171 A1 | 2/2017 | Vallius | |
| 2017/0034435 A1 | 2/2017 | Vallius | |
| 2017/0059879 A1* | 3/2017 | Vallius | G02B 27/4205 |
| 2017/0102543 A1 | 4/2017 | Vallius | |
| 2017/0102544 A1 | 4/2017 | Vallius | |
| 2017/0122725 A1 | 5/2017 | Yeoh | |
| 2017/0123208 A1 | 5/2017 | Vallius | |
| 2017/0124928 A1 | 5/2017 | Edwin | |
| 2017/0131460 A1 | 5/2017 | Lin | |
| 2017/0131545 A1 | 5/2017 | Wall | |
| 2017/0131546 A1 | 5/2017 | Woltman | |
| 2017/0131551 A1 | 5/2017 | Robbins | |
| 2017/0139210 A1 | 5/2017 | Vallius | |
| 2017/0153460 A1 | 6/2017 | Vallius et al. | |
| 2017/0184848 A1 | 6/2017 | Vallius | |

FOREIGN PATENT DOCUMENTS

| | | |
|---|---|---|
| CN | 103677448 A | 3/2014 |
| CN | 103995354 A | 8/2014 |
| EP | 2163924 A1 | 3/2010 |
| EP | 2752691 A1 | 7/2014 |
| EP | 2887119 A1 | 6/2015 |
| GB | 2495398 A | 4/2013 |
| JP | S6218502 A | 1/1987 |
| WO | 1995004294 A2 | 2/1995 |
| WO | 99/52002 A1 | 10/1999 |
| WO | 2004055556 A1 | 7/2004 |
| WO | 2004109349 A2 | 12/2004 |
| WO | 2006064334 A1 | 6/2006 |
| WO | 2006132614 A1 | 12/2006 |
| WO | 2007141589 A1 | 12/2007 |
| WO | 2008038058 A1 | 4/2008 |
| WO | 2008081070 A1 | 7/2008 |
| WO | 2008148927 A1 | 12/2008 |
| WO | 2009077803 A1 | 6/2009 |
| WO | 2009101236 A1 | 8/2009 |
| WO | 2009101238 A1 | 8/2009 |
| WO | 2010062481 A1 | 1/2011 |
| WO | 2012169889 A1 | 12/2012 |
| WO | 2013033274 A1 | 3/2013 |
| WO | 2013144565 A1 | 10/2013 |
| WO | 2013167864 A1 | 11/2013 |
| WO | 2014019558 A1 | 2/2014 |
| WO | 2015063808 A1 | 5/2015 |
| WO | 2016130358 A1 | 8/2016 |

OTHER PUBLICATIONS

Mirza, et al., "Key Challenges to Affordable See Through Wearable Displays: The Missing Link for Mobile AR Mass Deployment", In Proceedings of SPIE 8720, Photonic Applications for Aerospace, Commercial, and Harsh Environments IV, May 31, 2013, pp. 1-6. (6 pages total).

Levola, Tapani, "Diffractive Optics for Virtual Reality Displays", In Journal of the Society for Information Display, Dec. 2006, (1 page total).

Saarikko, Pasi, "Diffractive Exit-Pupil Expander with a Large Field of View", In Proceedings of Photonics in Multimedia II, 700105 SPIE 7001, Apr. 25, 2008, (3 Pages total).

Kimmel, Jyrki, "Mobile Display Backlight Light Guide Plates Based on Slanted Grating Arrays", In Proceedings of Journal of Photonics for Energy, vol. 2, Mar. 12, 2012, (1 Page total).

Levola, et al., "Replicated Slanted Gratings with a High Refractive Index Material for in and Outcoupling of Light", In Proceedings of Optics Express, vol. 15, Issue 5, Mar. 5, 2007, (8 pages total).

Yang, et al., "High-performance and Compact Binary Blazed Grating Coupler Based on an Asymmetric Subgrating Structure and Vertical Coupling", In Optics Letters, vol. 36, No. 14, Jul. 15, 2011, (5 pages total).

(56) References Cited

OTHER PUBLICATIONS

Todd, Michael D., "Fiber Optic Bragg Grating-Based Sensing", Published on: Jun. 15, 2012, Available at: http://www.sem.org/pdf/fiber_bragg_grating_sensing.pdf (36 pages total).
Zhang, et al., "Advances in Optical Fiber Bragg Grating Sensor Technologies", In Photonic Sensors, vol. 2, No. 1, Mar. 2012, (13 pages total).
Uranga, et al., "Focused Ion Beam Nano-structuring of Photonic Bragg Gratings in Al2o3 Waveguides", In Proceedings of 12th Annual Symposium IEEE/LEOS Benelux, Dec. 17, 2007, (4 pages total).
Cheng, et al., "Design of an Ultra-Thin Near-Eye Display with Geometrical Waveguide and Freeform Optics", In Proceedings of Optics Express, vol. 22, Issue 17, Aug. 2014, (15 pages total).
Wang, et al., "Guided-Mode Resonance in Planar Dielectric-Layer Diffraction Gratings", In Journal of Optics Infobase, vol. 7, Isuue 8, Aug. 1, 1990, (3 pages total).
Sentenac, et al., "Angular Tolerant Resonant Grating Filters under Oblique Incidence", Journal of Optics Soc. Am. A, vol. 22, No. 4, Mar. 2005, pp. 475-480 (6 pages total).
Powell, et al., "Novel Approach to Exit Pupil Expansion for Wearable Displays", In Proceeding of the SPIE 4711, Helmet- and Head-Mounted Displays VII, Aug. 5, 2002, (3 pages total).
Urey, et al, "Microlens Array-Based Exit Pupil Expander for Full-Color Display Applications", In Proceedings of SPIE in Photon Management, vol. 5456, Apr. 2004, (10 pages total).
Zhu, et , "Optical Image Encryption Based on Interference of Polarized Light", In Proceedings of Optics Express, vol. 17, No. 16, Jul. 20, 2009, (7 pages total).
"Waveguide-based Displays Maturing for Augmented Reality Applications", Retrieved on: Jul. 14, 2015, Available at: http://www.displaydaily.com/articles/446-sponsored-articles/14132-waveguide-based-displays-maturing-for-augmented-reality-applications (5 pages total).
"International Search Report and Written Opinion Issued in PCT Application No. PCT/US2016/051563", dated Nov. 18, 2016, 10 Pages.
"International Search Report & Written Opinion Issued in PCT Application No. PCT/US2016/039705", dated Sep. 15, 2016, (13 Pages total).
"International Search Report and Written Opinion Issued in PCT Application No. PCT/US2016/038857", dated Sep. 28, 2016, (16 Pages total).
"International Search Report and Written Opinion Issued in PCT Application No. PCT/US2016/039706", dated Oct. 6, 2016, (13 Pages total).
"International Search Report and Written Opinion Issued in PCT Application No. PCT/US2016/044947", dated Oct. 11, 2016, (14 Pages total).
"International Search Report and Written Opinion Issued in PCT Application No. PCT/US2016/037460", dated Oct. 24, 2016, (12 Pages total).
"International Search Report and Written Opinion Issued in PCT Application No. PCT/US2016/058332", dated Feb. 21, 2017, 14 Pages.
Saarikko, et al., "Diffractive Exit-pupil Expander for Spherical Light Guide Virtual Displays Designed for Near-Distance Viewing", In the Journal of Optics A: Pure and Applied Optics, vol. 11, Issue 6, Mar. 31, 2009, 10 Pages.
"International Search Report and Written Opinion Issued in PCT Application No. PCT/US2016/061014", dated Feb. 10, 2017, 11 Pages.
"Second Written Opinion Issued in PCT Application No. PCT/US2016/039706", dated Jun. 27, 2017, (5 Pages total).
"Second Written Opinion Issued in PCT Application No. PCT/US2016/039705", dated Jul. 10, 2017, (7 Pages total).
"Second Written Opinion Issued in PCT Application No. PCT/US2016/044947", dated Jul. 13, 2017, (8 Pages total).
Non-Final Office Action received in U.S. Appl. No. 14/942,408, dated Dec. 14, 2017, 34 pages.
Notification of Transmittal of the International Preliminary Report on Patentability received in PCT/US2016/037460, dated Oct. 17, 2017, 13 pages.
Notification of Transmittal of the International Preliminary Report on Patentability received in PCT/US2016/044947, dated Nov. 16, 2017, 17 pages.
"Notice of Allowance Issued in U.S. Appl. No. 14/813,245", dated Apr. 10, 2018, 9 Pages.
"Notice of Allowance Issued in U.S. Appl. No. 14/837,626", dated Apr. 23, 2018, 9 Pages.
"Final Office Action Issued in U.S. Appl. No. 14/877,281", dated Apr. 19, 2018, 28 Pages.
"Final Office Action Issued in U.S. Appl. No. 14/788,174", dated Jun. 15, 2017, 13 Pages.
"Non Final Rejection Issued in U.S. Appl. No. 14/788,174", dated Feb. 17, 2017, 15 Pages.
"Final Office Action Issued in U.S. Appl. No. 14/790,379", dated Sep. 7, 2017, 11 Pages.
"Non Final Office Action Issued in U.S. Appl. No. 14/790,379", dated Jan. 10, 2018, 9 Pages.
"Non Final Office Action Issued in U.S. Appl. No. 14/790,379", dated Jun. 22, 2018, 9 Pages.
"Non-Final Office Action Issued in U.S. Appl. No. 14/790,379", dated Mar. 24, 2017, 9 Pages.
"Non Final Office Action Issued in U.S. Appl. No. 14/813,245", dated Sep. 8, 2017, 7 Pages.
"Non Final Office Action Issued in U.S. Appl. No. 14/813,305", dated Jun. 6, 2017, 23 Pages.
"Final Office Action Issued in U.S. Appl. No. 14/837,626", dated Dec. 19, 2017, 10 Pages.
"Non Final Office Action Issued in U.S. Appl. No. 14/837,626", dated Jun. 16, 2017, 13 Pages.
"Final Office Action Issued in U.S. Appl. No. 14/877,281", dated Jul. 31, 2017, 15 Pages.
"Non Final Office Action Issued in U.S. Appl. No. 14/877,281", dated Sep. 11, 2018, 29 Pages.
"Non-Final Office Action Issued in U.S. Appl. No. 14/877,281", dated Dec. 19, 2017, 25 Pages.
"Non-Final Office Action Issued in U.S. Appl. No. 14/877,281", dated Mar. 30, 2017, 13 Pages.
"Non Final Office Action Issued in U.S. Appl. No. 14/926,643", dated Jun. 9, 2017, 23 Pages.
"Final Office Action Issued in U.S. Appl. No. 14/942,408", dated Jul. 10, 2018, 12 Pages.
"Second Written Opinion Issued in PCT Application No. PCT/US/2016/058332", dated Dec. 14, 2017, 10 Pages.
"International Preliminary Report on Patentability Issued in PCT Application No. PCT/US2016/039706", dated Oct. 31, 2017, 6 Pages.
"International Preliminary Report on Patentability Issued in PCT Application No. PCT/US2016/051563", dated Jan. 22, 2018, 7 Pages.
"Second Written Opinion Issued in PCT Application No. PCT/US2016/051563", dated Aug. 17, 2017, 5 Pages.
"International Preliminary Report on Patentability Issued in PCT Application No. PCT/US2016/058332", dated Feb. 13, 2018, 11 Pages.
"Second Written Opinion Issued in PCT Application No. PCT/US2016/061014", dated Nov. 3, 2017 5 Pages.

* cited by examiner

REDUCING STRAY LIGHT TRANSMISSION IN NEAR EYE DISPLAY USING RESONANT GRATING FILTER

BACKGROUND

Diffractive optical elements (DOEs) are optical elements with a periodic structure that are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

A near eye optical display system comprising a waveguide and diffractive optical elements (DOEs) for in-coupling, exit pupil expansion, and out-coupling reduces the transmission of stray light in the system using a doubly-periodic surface relief microstructure that combines a guided-mode resonant filter with Bragg reflectance. Such resonant grating filter may be configured with grating features including grooves and/or ridges of different widths on the waveguide that have respective sub-periods that match Bragg reflectance periods for particular wavelengths. The interaction of the sub-periods gives rise to a photonic band gap effect in which the resonant grating's effective refractive index is modulated to increase angular sensitivity and wavelength bandwidth of the resonant grating filter. The sub-periods define an overall period (i.e., a super period) for the resonant grating filter by which incident light is coupled into the waveguide, guided, and then coupled out of the waveguide at the side of incidence.

The resonant grating filter can achieve total spectral reflectance of incident light over a wide range of wavelengths and angles of incidence to thereby reduce or block the transmission of stray light in the system. Adjusting groove widths and sub-periods enables the resonant grating filter to be tuned to particular wavelengths and incidence angles. In some applications, resonant grating filters can be implemented in layers on the display waveguide in which each layer blocks particular bands of wavelengths and angles of incident light. The resonant grating filter can further be implemented using thin and lightweight structures that enable low system weight (which can be advantageous in some applications such as head mounted display systems) without compromising the optical properties of the display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
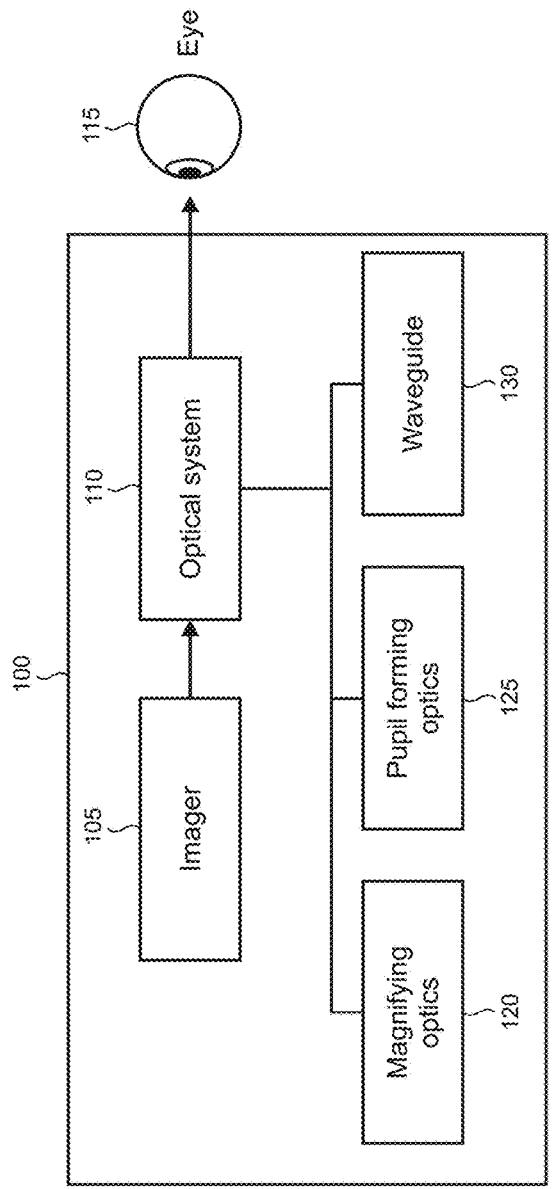
FIG. 1 shows a block diagram of an illustrative near eye display system which may incorporate a resonant grating filter configured to reduce stray light transmission.

FIG. 1 shows a block diagram of an illustrative near eye display system 100 which may incorporate one or more resonant grating filters for blocking the transmission of extraneous stray light in the system. In an illustrative embodiment, the near eye display system uses a combination of diffractive optical elements (DOEs) that provide in-coupling of incident light into a waveguide, exit pupil expansion in two directions, and out-coupling of light out of the waveguide. Near eye display systems are frequently used, for example, in head mounted display (HMD) devices in industrial, commercial, and consumer applications. Other devices and systems may also use resonant grating filters, as described below. The near eye display system 100 is an example that is used to illustrate various features and aspects, and the resonant grating filters are not necessarily limited to near eye display systems using DOEs.

System 100 may include an imager 105 that works with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130.

In a near eye display system the imager does not actually shine the images on a surface such as a glass lens to create the visual display for the user. This is not feasible because the human eye cannot focus on something that is that close. Rather than create a visible image on a surface, the near eye optical system 100 uses the pupil forming optics 125 to form a pupil and the eye 115 acts as the last element in the optical chain and converts the light from the pupil into an image on the eye's retina as a virtual display.

Figure 2:
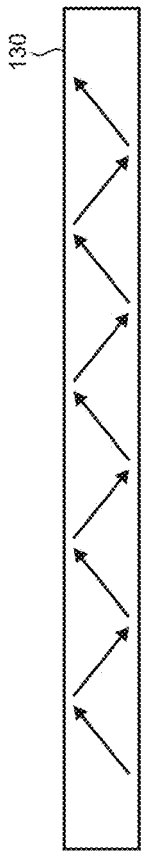
FIG. 2 shows propagation of light in a waveguide by total internal reflection.

The waveguide 130 facilitates light transmission between the imager and the eye. One or more waveguides can be utilized in the near eye display system because they are transparent and because they are generally small and lightweight (which is desirable in applications such as HMD devices where size and weight is generally sought to be minimized for reasons of performance and user comfort). For example, the waveguide 130 can enable the imager 105 to be located out of the way, for example, on the side of the head, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
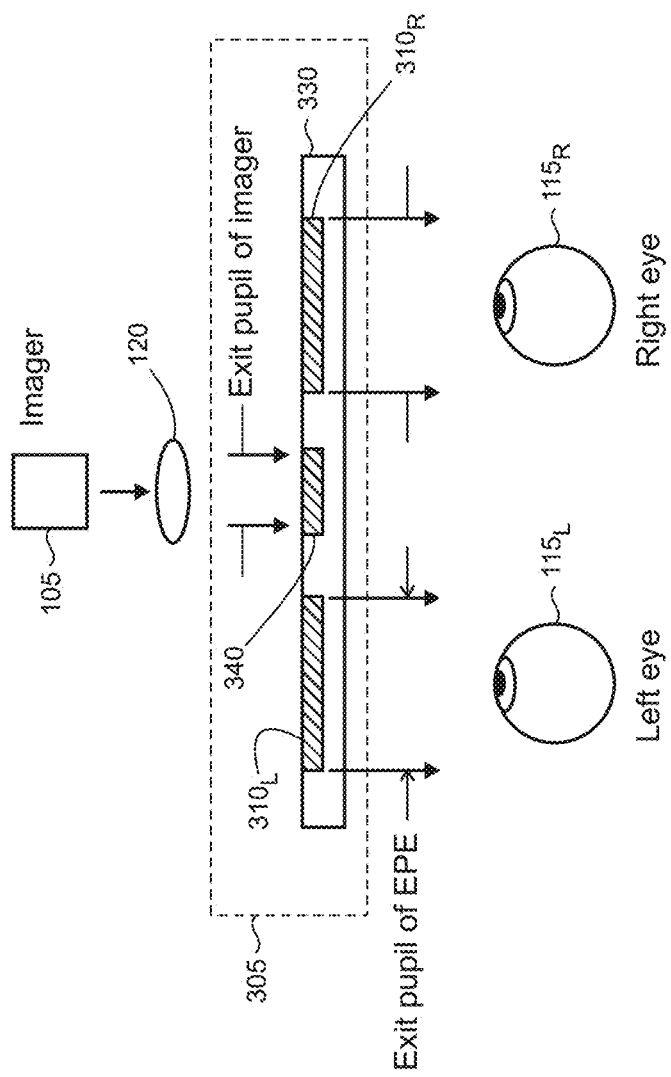
FIG. 3 shows a view of an illustrative exit pupil expander.

FIG. 3 shows a view of an illustrative exit pupil expander (EPE) 305. EPE 305 receives an input optical beam from the imager 105 through magnifying optics 120 to produce one or more output optical beams with expanded exit pupil in one or two directions relative to the exit pupil of the imager (in general, the input may include more than one optical beam which may be produced by separate sources). The expanded exit pupil typically facilitates a virtual display to be sufficiently sized to meet the various design requirements of a given optical system, such as image resolution, field of view, and the like, while enabling the imager and associated components to be relatively light and compact.

The EPE 305 is configured, in this illustrative example, to support binocular operation for both the left and right eyes. Components that may be utilized for stereoscopic operation such as scanning mirrors, lenses, filters, beam splitters, MEMS devices, or the like are not shown in FIG. 3 for sake of clarity in exposition. The EPE 305 utilizes two out-coupling gratings, $310_L$ and $310_R$ that are supported on a waveguide 330 and a central in-coupling grating 340. The in-coupling and out-coupling gratings may be configured using multiple DOEs, as described in the illustrative example below. While the EPE 305 is depicted as having a planar configuration, other shapes may also be utilized including, for example, curved or partially spherical shapes, in which case the gratings disposed thereon are non-coplanar.

Figure 4:
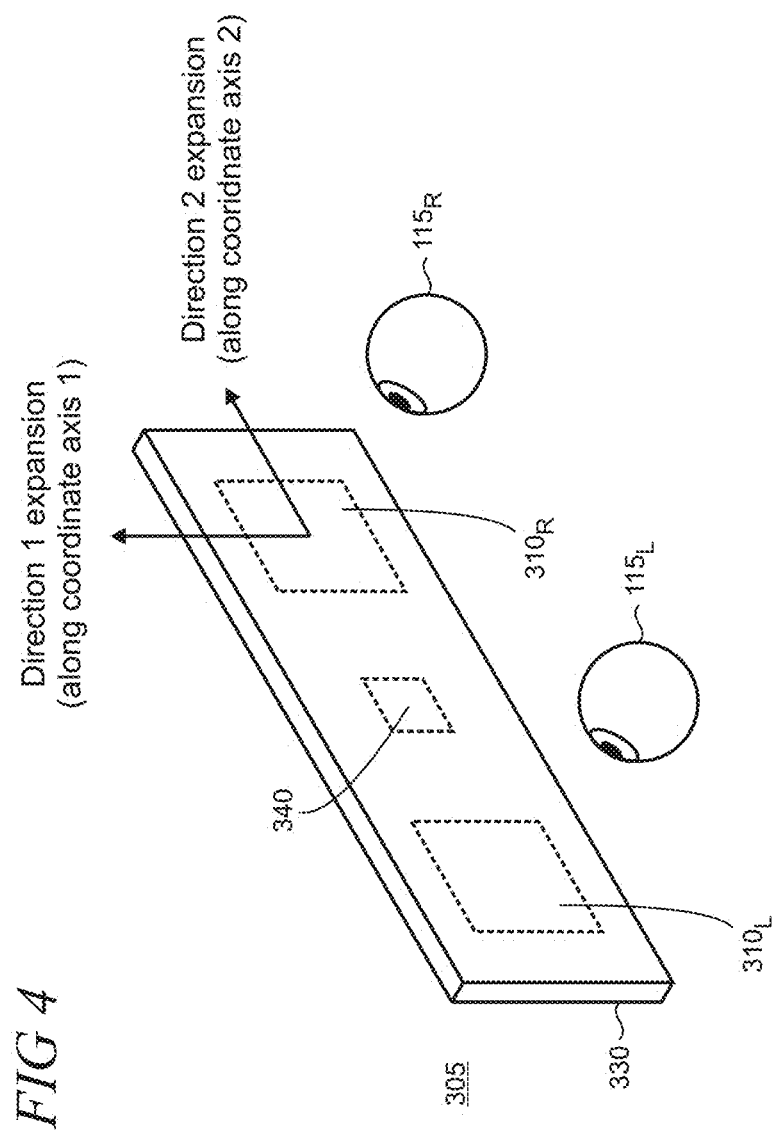
FIG. 4 shows a view of the illustrative exit pupil expander in which the exit pupil is expanded along two directions.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near eye display device is upright and forward facing, but less intuitive for other usage scenarios. The listed terms are not to be construed to limit the scope of the configurations (and usage scenarios therein) of DOEs with varying depth modulation direction.

Figure 5:
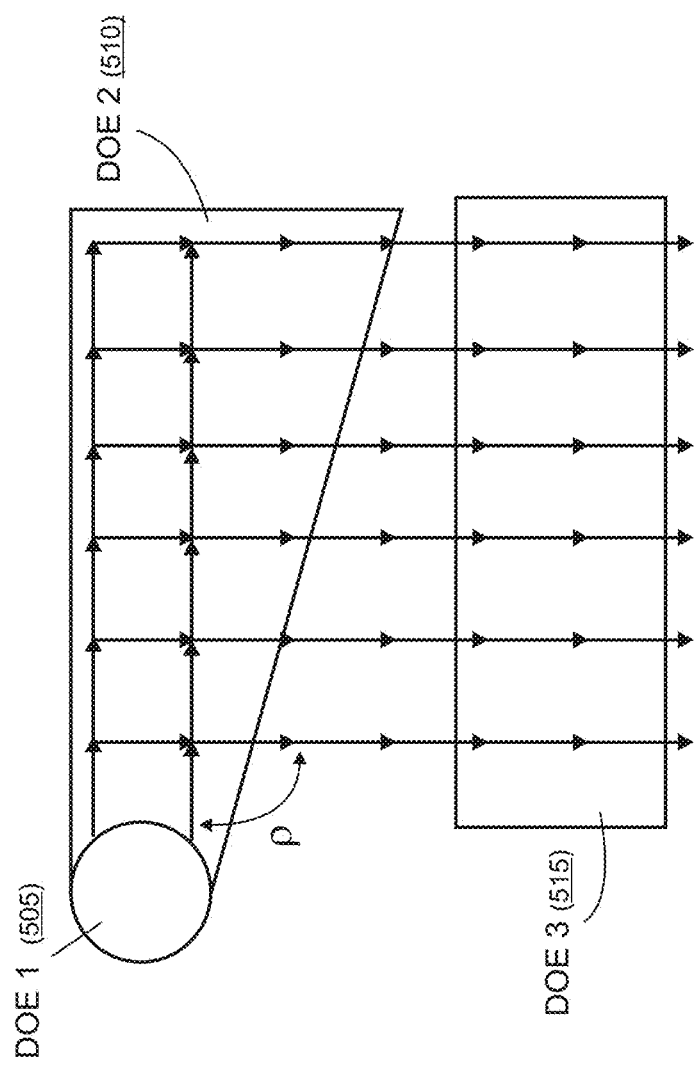
FIG. 5 shows an illustrative arrangement of three DOEs.

FIG. 5 shows an illustrative arrangement of three DOEs that may be used with, or as a part of, a waveguide to provide in-coupling, expansion of the exit pupil in two directions, and out-coupling. Each DOE is an optical element comprising a periodic structure that can modulate various properties of light in a periodic pattern such as the direction of optical axis, optical path length, and the like. The first DOE, DOE 1 (indicated by reference numeral 505), is configured to couple the beam from the imager into the waveguide. The second DOE, DOE 2 (510), expands the exit pupil in a first direction along a first coordinate axis, and the third DOE, DOE 3 (515), expands the exit pupil in a second direction along a second coordinate axis and couples light out of the waveguide. The angle ρ is a rotation angle between the periodic lines of DOE 2 and DOE 3 as shown. DOE 1 thus functions as an in-coupling grating and DOE 3 functions as an out-coupling grating while expanding the pupil in one direction. DOE 2 may be considered as an intermediate grating that functions to couple light between the in-coupling and out-coupling gratings while performing exit pupil expansion in another direction. Using such intermediate grating may eliminate a need for conventional functionalities for exit pupil expansion in an EPE such as collimating lenses.

Figure 6:
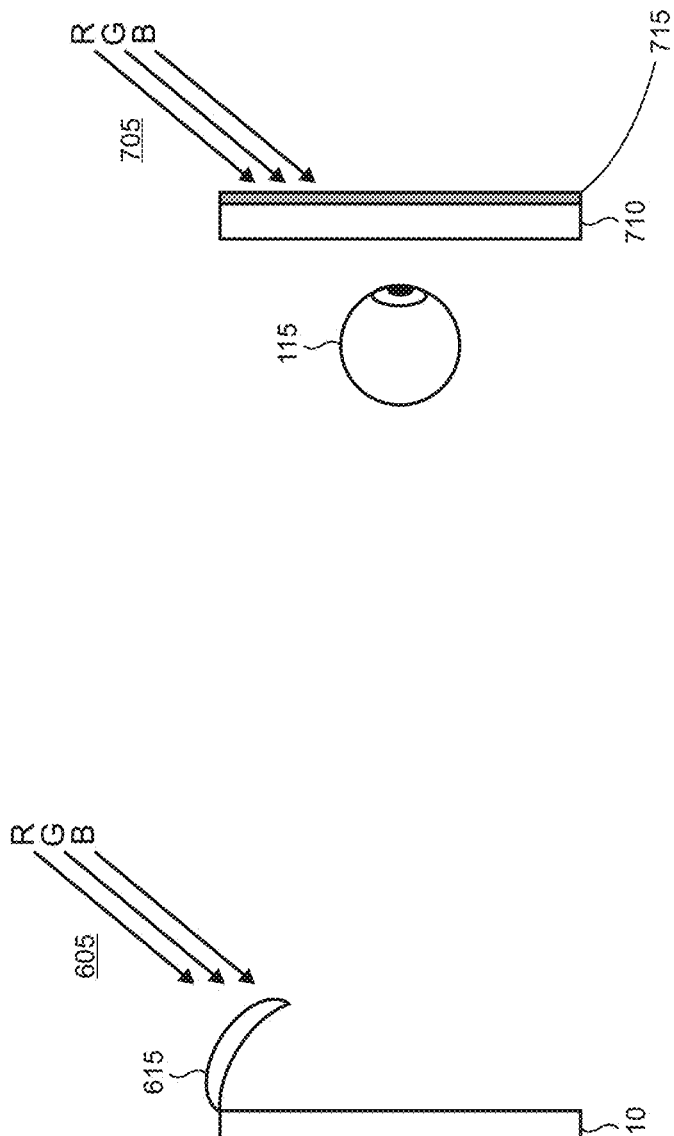
FIG. 6 shows an illustrative near eye display in which a visor is utilized to reduce transmission of stray light.

Display systems, when implemented with waveguide structures and gratings in DOEs as described above, may be sensitive to stray light. Stray light can be generated by various sources in a usage environment for the display system and is extraneous to the scene being imaged on the display. The grating elements, for example, can scatter stray light which may cause undesirable visual effects or artifacts in the display such as haze, rainbows, and low contrast. As shown in FIG. 6, stray light 605 (depicted as red, green, and blue—RGB—components) can be blocked from impinging on the side of the waveguide 610 opposite the eye 115 using a visor 615 (it is noted that other components of the display system are omitted from the drawing for sake of clarity in exposition). While the visor 615 can provide satisfactory stray light blocking in some implementations, it can add weight to the display system and thus may be a less optimal solution particularly, for example, in HMD applications.

Figure 7:
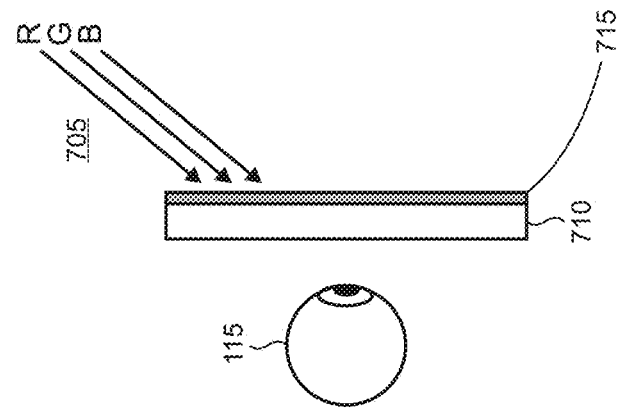
FIG. 7 shows an illustrative near eye display in which an absorbing layer is utilized to reduce transmission of stray light.

FIG. 7 shows another illustrative solution for blocking stray light 705 using a light absorbing layer 715 that is disposed on the light-incident side of a waveguide 710. The light absorbing layer 715 may be formed, for example, using a coating or other suitable light absorbing material. While the light absorbing layer generally does not add significant weight to the system, it may compromise optical performance of the display system in some cases because light absorption is sensitive to wavelength and/or the angle of incidence. In addition, the light absorbing layer can add opacity to the display which may reduce the user's ability to see through the display in mixed reality applications.

Figure 8:
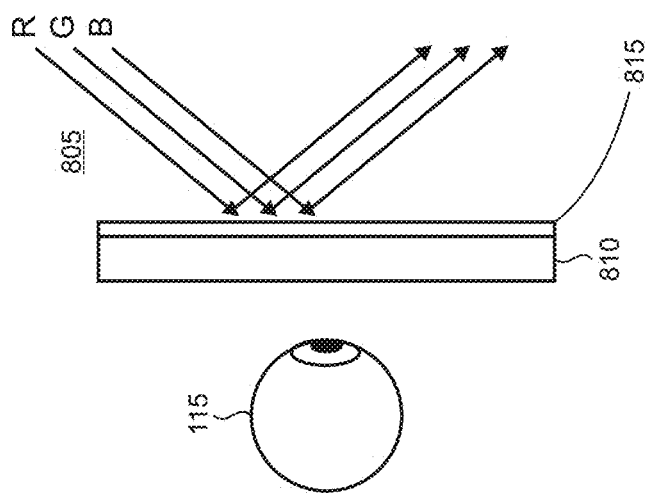
FIG. 8 shows an illustrative near eye display in which a resonant grating filter is utilized to reduce transmission of stray light.

In comparison to the physical light blocking visor 615 and light absorbing layer 715 shown respectively in FIGS. 6 and 7, FIG. 8 shows an arrangement in which a light reflecting layer 815 is disposed on the light-incident side of a waveguide 810. In some implementations, the light reflecting layer 815 can be directly incorporated into the structure of the waveguide 810. In alternative implementations, the layer 815 can be a discrete optical element that is separate from the waveguide, and/or may incorporate its own waveguide structure. The light reflecting layer 815 can block stray light 805 using a waveguide resonance effect produced by a doubly-periodic grating microstructure that may be tuned to a particular wavelength band and incidence angle band to block stray light. The resonant grating microstructure may be implemented as a thin and lightweight optical element that can achieve wideband and wide angle spectral reflectance without compromising other optical parameters so that see-through-ability, for example, is maintained.

The light reflecting layer 815 can be implemented and shaped to suit a given application. For example, the layer can be planar, curved, or use a combination of planar and curved elements. In some applications the light reflecting layer can be located on an outside surface of a waveguide (i.e., light-incident side) and/or on an inside surface of the waveguide (i.e., eye side). In other applications, the light reflecting layer can be incorporated into a protective lens or other suitable component of a display system that is separate from the waveguide. The light reflecting layer can be implemented using a molded polymer in some implementations which may be beneficial in applications where weight and bulk is sought to be minimized, such as in HMD systems and devices.

Figure 9:
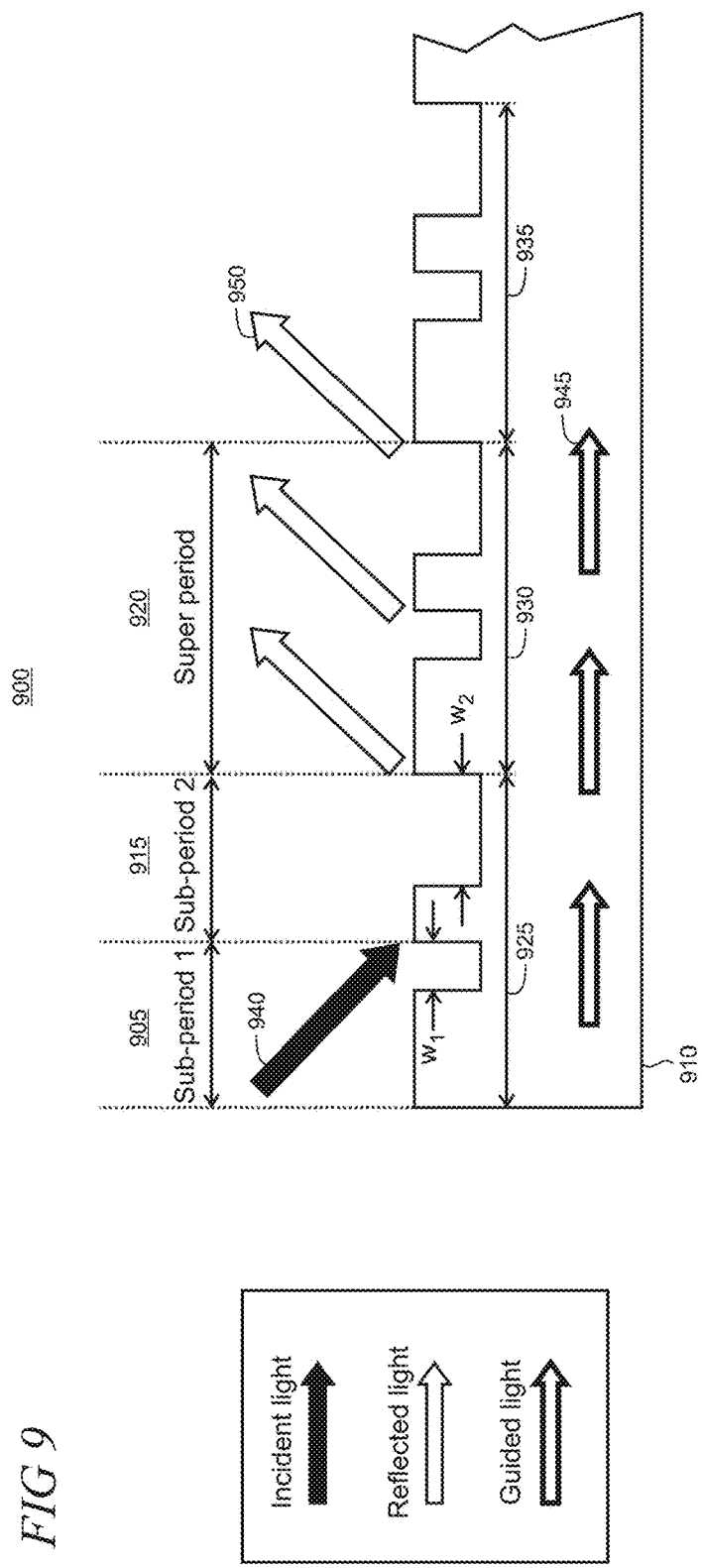
FIG. 9 shows a profile view of an illustrative resonant grating filter.

FIG. 9 shows a profile of an illustrative resonant, doubly-periodic grating microstructure 900 that is configured using surface relief contours in a waveguide 910. The grating microstructure may be used in one more light reflecting layers. The grating microstructure 900 includes grating features that are described using two different sub-periods. While straight grating features are shown in FIG. 9, asymmetric gratings in which the grating walls are slanted (i.e., non-orthogonal to the plane of the waveguide), and/or blazed gratings (e.g., triangular or sawtooth-profiled gratings) may also be utilized in some implementations. Sub-period 1 (indicated by reference numeral 905) includes a grating groove width $w_1$ and sub-period 2 (indicated by reference numeral 915) includes a grating groove width $w_2$ in which $w_2 > w_1$ in this example, and accordingly the respective periods associated with sub-period 1 and sub-period 2 are not equal.

The sub-periods are selected to match Bragg reflectance periods for the waveguide 910 which enables utilization of a photonic bandgap effect to modulate the effective refractive index of the waveguide to increase the bandwidth of angular sensitivity and wavelength of the reflected light. The Bragg periods may be implemented to tune the resonant microstructure to a wavelength (or range of wavelengths) and angular sensitivity that meets a particular design goal.

The grating features in sub-periods 1 and 2 combine to form an overall period, or super period, as indicated by reference numeral 920 (the section of waveguide 910 in the drawing shows three super periods 925, 930, and 935). The super period grating couples incident light 940 into the waveguide, propagated as guided light 945, and then coupled out of the waveguide at the original side of incidence as reflected light 950. The grating microstructure 900 can produce up to 100% reflectance at a wavelength and angular band of interest.

Figure 10:
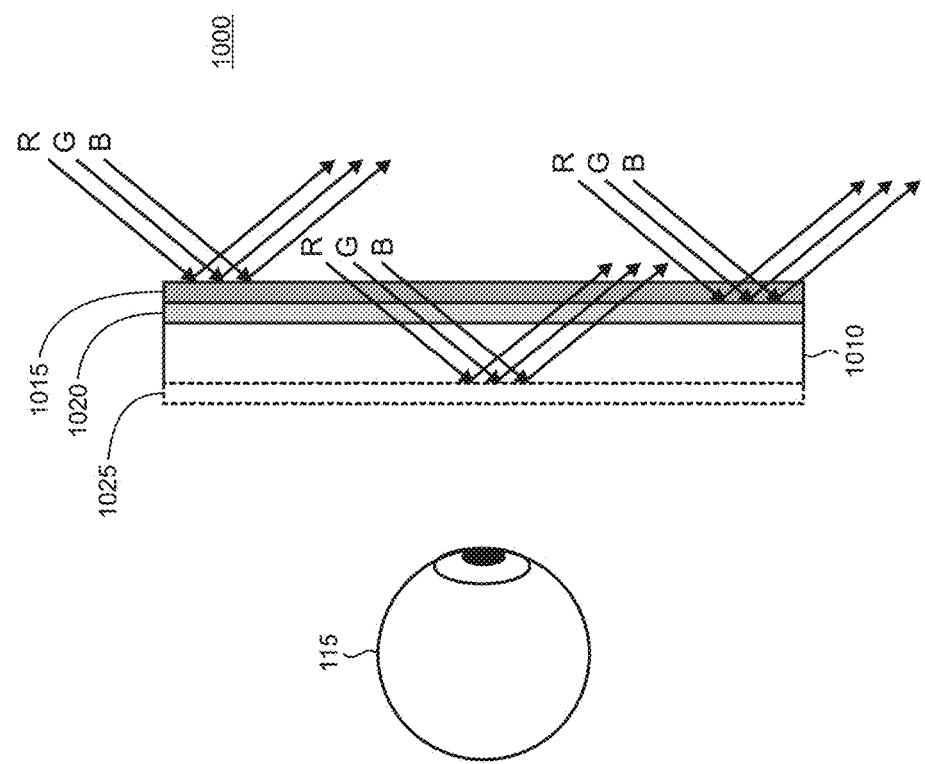
FIG. 10 shows an illustrative arrangement of multiple resonant grating filters that is implemented in separate reflective layers on a waveguide used in a display system.

FIG. 10 shows an illustrative arrangement 1000 of multiple resonant grating filters that is implemented in separate reflective layers 1015 and 1020 on a light-incident side of a waveguide 1010 used in a display system. A reflective layer 1025 may also be utilized on the eye side of the waveguide in some cases. Each of the reflecting layers may be tuned to a different wavelength band and/or angular band to provide broader spectral reflectance bandwidth and/or angular sensitivity than may be provided by a single reflective layer in some implementations.

Figure 11:
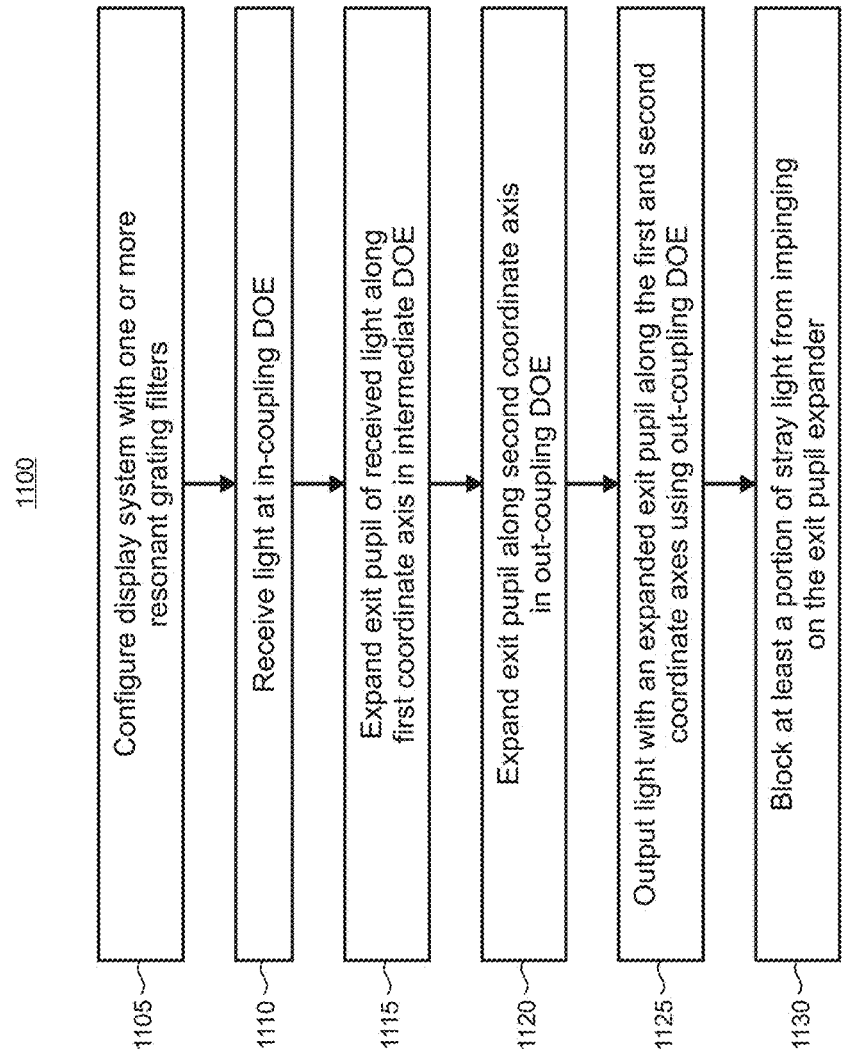
FIG. 11 shows an illustrative method.

FIG. 11 is a flowchart of an illustrative method 1100. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1105, a waveguide used in an EPE in a near eye display system is configured with one or more resonant grating filters. As discussed above, the resonant grating filters can be implemented using one or more layers on the outside (i.e., incident-light side) and/or inside (i.e., eye side) of the waveguide. In step 1110, light is received at an in-coupling DOE disposed in the EPE. The in-coupling DOE interfaces with a downstream intermediate DOE that is disposed in the EPE. The intermediate DOE is configured to interface with a downstream out-coupling DOE.

In step 1115, the exit pupil of the received light is expanded along a first coordinate axis in the intermediate DOE. In step 1120, the exit pupil is expanded along a second coordinate axis in an out-coupling DOE. In step 1125, the out-coupling DOE out-couples light from the EPE with an expanded exit pupil relative to the received light at the in-coupling DOE along the first and second coordinate axes. In some implementations, the out-coupling DOE may be apodized with shallow gratings that are configured to be either straight or slanted. In step 1130, at least a portion of stray light is blocked from impinging on the EPE using a resonant grating filter.

Resonant grating filters may be incorporated into one or more light reflecting layers to block stray light in a display system that is utilized in a virtual or mixed reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations.

Figure 12:
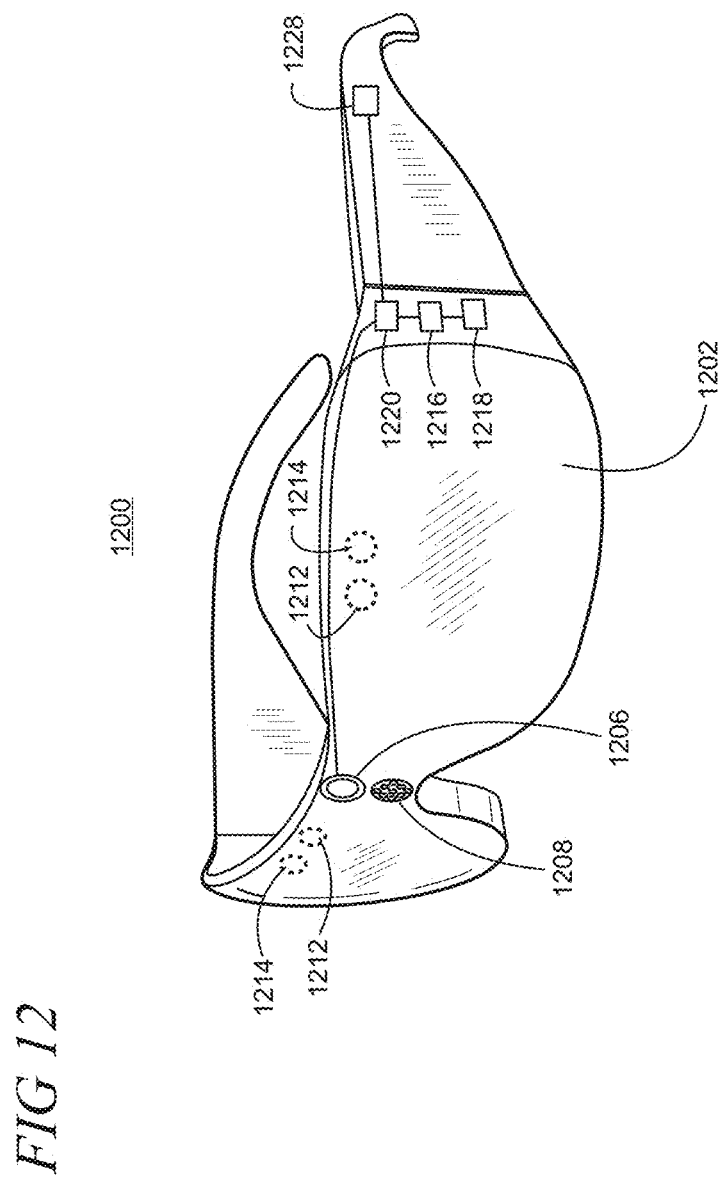
FIG. 12 is a pictorial view of an illustrative example of a virtual reality or mixed reality head mounted display (HMD) device.
Figure 13:
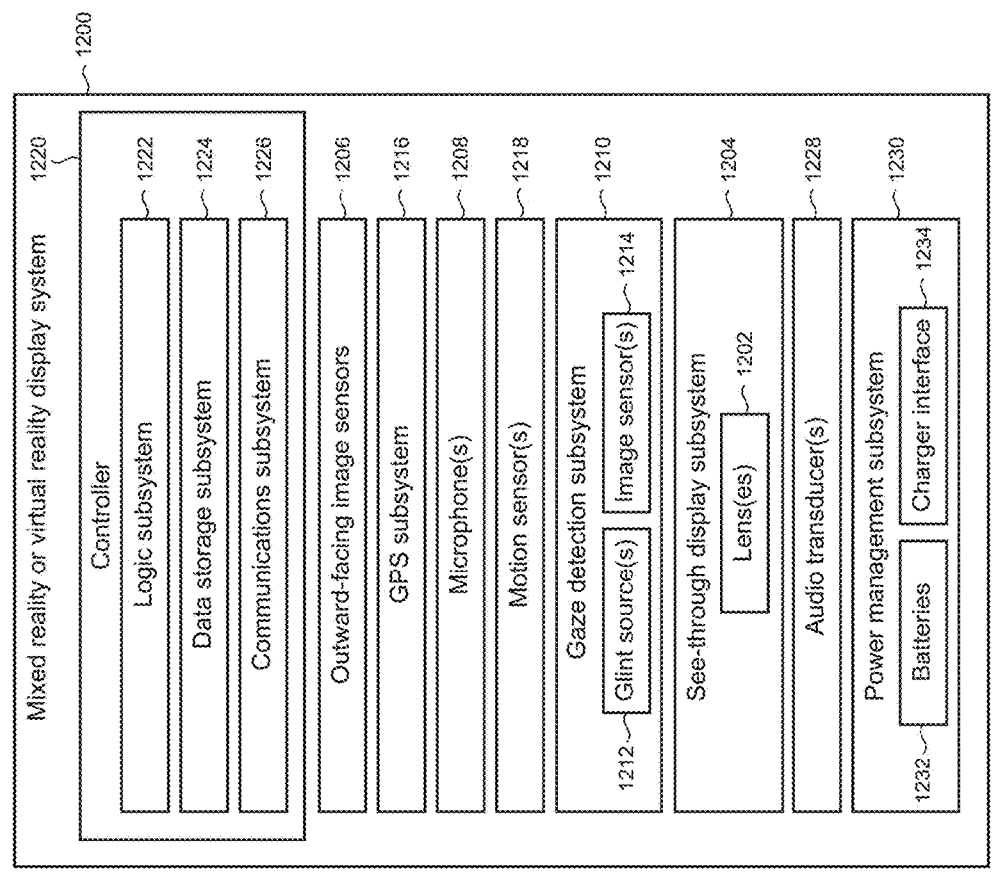
FIG. 13 shows a block diagram of an illustrative example of a virtual reality or mixed reality HMD device.

FIG. 12 shows one particular illustrative example of a see-through, mixed reality or virtual reality display system 1200, and FIG. 13 shows a functional block diagram of the system 1200. Display system 1200 comprises one or more lenses 1202 that form a part of a see-through display subsystem 1204, such that images may be displayed using lenses 1202 (e.g. using projection onto lenses 1202, one or more waveguide systems incorporated into the lenses 1202, and/or in any other suitable manner). Display system 1200 further comprises one or more outward-facing image sensors 1206 configured to acquire images of a background scene and/or physical environment being viewed by a user, and may include one or more microphones 1208 configured to detect sounds, such as voice commands from a user. Outward-facing image sensors 1206 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 1200 may further include a gaze detection subsystem 1210 configured for detecting a direction of gaze of each eye of a user or a direction or location of focus, as described above. Gaze detection subsystem 1210 may be configured to determine gaze directions of each of a user's eyes in any suitable manner. For example, in the illustrative example shown, a gaze detection subsystem 1210 includes one or more glint sources 1212, such as infrared light sources, that are configured to cause a glint of light to reflect from each eyeball of a user, and one or more image sensors 1214, such as inward-facing sensors, that are configured to capture an image of each eyeball of the user. Changes in the glints from the user's eyeballs and/or a location of a user's pupil, as determined from image data gathered using the image sensor(s) 1214, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1210 may have any suitable number and arrangement of light sources and image sensors. In some implementations, the gaze detection subsystem 1210 may be omitted.

The display system 1200 may also include additional sensors. For example, display system 1200 may comprise a global positioning system (GPS) subsystem 1216 to allow a location of the display system 1200 to be determined. This may help to identify real world objects, such as buildings, etc. that may be located in the user's adjoining physical environment.

The display system 1200 may further include one or more motion sensors 1218 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1206. The use of motion data may allow changes in gaze location to be tracked even if image data from outward-facing image sensor(s) 1206 cannot be resolved.

In addition, motion sensors 1218, as well as microphone(s) 1208 and gaze detection subsystem 1210, also may be employed as user input devices, such that a user may interact with the display system 1200 via gestures of the eye, neck and/or head, as well as via verbal commands in some cases. It may be understood that sensors illustrated in FIGS. 12 and 13 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1200 can further include a controller 1220 having a logic subsystem 1222 and a data storage subsystem 1224 in communication with the sensors, gaze detection subsystem 1210, display subsystem 1204, and/or other components through a communications subsystem 1226. The communications subsystem 1226 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1224 may include instructions stored thereon that are executable by logic subsystem 1222, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1200 is configured with one or more audio transducers 1228 (e.g., speakers, earphones, etc.) so that audio can be utilized as part of a mixed reality or virtual reality experience. A power management subsystem 1230 may include one or more batteries 1232 and/or protection circuit modules (PCMs) and an associated charger interface 1234 and/or remote power interface for supplying power to components in the display system 1200.

It may be appreciated that the display system 1200 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 14:
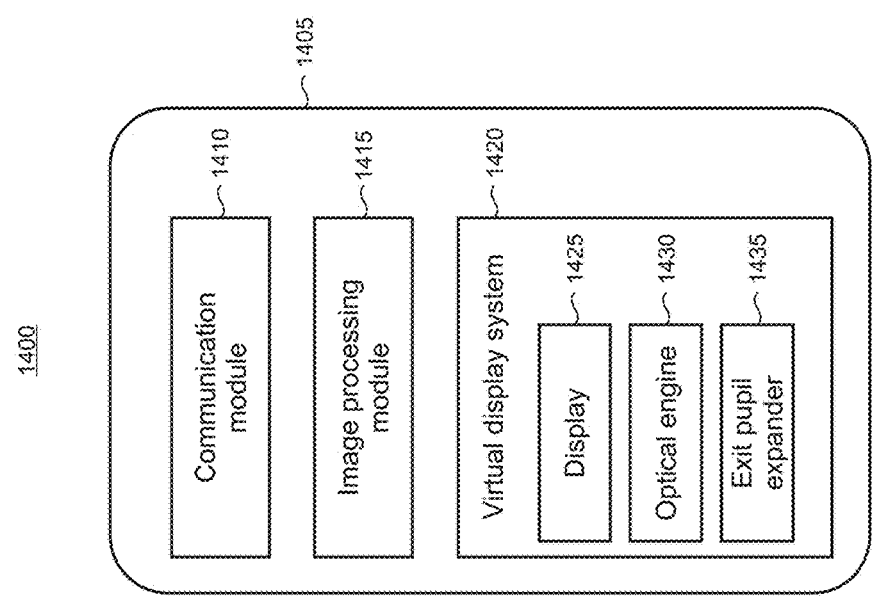
FIG. 14 shows a block diagram of an illustrative electronic device that incorporates an exit pupil expander.

As shown in FIG. 14, resonant grating filters for stray light blocking can be used in a mobile or portable electronic device 1400, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 1400 includes a housing 1405 to house a communication module 1410 for receiving and transmitting information from and to an external device, or a remote system or service (not shown).

The portable device 1400 may also include an image processing module 1415 for handling the received and transmitted information, and a virtual display system 1420 to support viewing of images. The virtual display system 1420 can include a micro-display or an imager 1425 and an optical engine 1430. The image processing module 1415 may be operatively connected to the optical engine 1430 to provide image data, such as video data, to the imager 1425 to display an image thereon. An EPE 1435 can be optically linked to an optical engine 1430. The EPE may incorporate or be part of a system that includes resonant grating filters disposed in one or more layers to block transmission of stray light in the device.

Resonant grating filters for stray light blocking may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present reducing stray light transmission in near eye display using resonant grating filter are now presented by way of illustration and not as an exhaustive list of all embodiments. An example includes an optical system, comprising: a substrate of optical material; a first diffractive optical element (DOE) disposed on the substrate, the first DOE having an input surface and configured as an in-coupling grating to receive one or more optical beams as an input; and a second DOE disposed on the substrate and configured for pupil expansion of the one or more optical beams along a first direction, a third DOE disposed on the substrate, the third DOE having an output surface and configured for pupil expansion of the one or more optical beams along a second direction, and further configured as an out-coupling grating to couple, as an output from the output surface, one or more optical beams with expanded pupil relative to the input; and a doubly-periodic grating configured to block stray light from the optical system.

In another example, the doubly-periodic grating modulates an effective refractive index for a waveguide through a photonic bandgap effect. In another example, the doubly-periodic grating includes grating features with a first sub-period and a second sub-period in which respective periods of the first and second sub-period are non-equal. In another example, the first sub-period and second sub-period combine to form an overall super period for the grating features, the grating features providing in-coupling of incident light into a waveguide, guiding the light in the waveguide, and out-coupling the light out of the waveguide of the light at a light-incident side of the waveguide. In another example, the optical system further comprises a second doubly-periodic grating in which each doubly-periodic grating is disposed in a separate reflecting layer in the optical system and each reflecting layer is configured to reflect different wavelengths of incident light or each reflecting layer is configured with different angular sensitivity.

A further example includes an electronic device, comprising: a data processing unit; an optical engine operatively connected to the data processing unit for receiving image data from the data processing unit; an imager operatively connected to the optical engine to form images based on the image data and to generate one or more input optical beams incorporating the images; and an exit pupil expander, responsive to the one or more input optical beams, comprising a structure on which multiple diffractive optical elements (DOEs) are disposed, in which the exit pupil expander is configured to provide one or more output optical beams, using one or more of the DOEs, as a near eye virtual display with an expanded exit pupil; and a resonant grating filter comprising a doubly-periodic surface relief microstructure configured to block stray light from the exit pupil expander, within a predetermined range of wavelengths and angles of incidence, from being transmitted in the exit pupil expander.

In another example, the doubly-periodic surface relief microstructure includes a waveguide having grating elements configured using a first sub-period and second sub-period and in which a super period is formed from the first sub-period and second sub-period. In another example, the exit pupil expander provides pupil expansion in two directions. In another example, the imager includes one of light emitting diode, liquid crystal on silicon device, organic light emitting diode array, or micro-electro mechanical system device. In another example, the imager comprises a micro-display operating in one of transmission, reflection, or emission. In another example, the electronic device is implemented in a head mounted display device or portable electronic device. In another example, each of the one or more input optical beams is produced by a corresponding one or more sources. In another example, the structure is curved or partially spherical. In another example, two or more of the DOEs are non-co-planar.

A further example includes a method, comprising: receiving light at an in-coupling diffractive optical element (DOE) disposed in an exit pupil expander; expanding an exit pupil of the received light along a first coordinate axis in an intermediate DOE disposed in the exit pupil expander; expanding the exit pupil along a second coordinate axis in an out-coupling DOE disposed in the exit pupil expander; outputting light with an expanded exit pupil relative to the received light at the in-coupling DOE along the first and second coordinate axes using the out-coupling DOE; and blocking at least a portion of stray light from impinging on the exit pupil expander using a resonant grating filter.

In another example, the resonant grating filter is configured as a doubly-periodic surface relief microstructure in a waveguide in which grating features are arranged using a first sub-period and a second sub-period that are equal to Bragg reflectance periods for the waveguide. In another example, light received at the in-coupling DOE emanates as a virtual image produced by a micro-display or imager. In another example at least a portion of the out-coupling DOE is an apodized diffraction grating having shallow grooves relative to the in-coupling DOE or the intermediate DOE. In another example, the method is performed in a near eye display system. In another example, the output light provides a virtual display to a user of the near eye display system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An optical system for displaying virtual images and real images, comprising:
   a see-through substrate of optical material forming a waveguide having a display side and a non-display side opposite the display side;
   a first diffractive optical element (DOE) disposed on the substrate, the first DOE having an input surface and configured as an in-coupling grating to receive one or more optical beams comprising the virtual images as an input to the optical system;
   a second DOE disposed on the display side of the waveguide and configured for pupil expansion of the one or more optical beams along a first direction,
   a third DOE disposed on the display side of the waveguide, the third DOE having an output surface on the display side of the waveguide and configured for pupil expansion of the one or more optical beams along a second direction, and further configured as an out-coupling grating to couple, as an output from the output surface on the display side of the waveguide, one or more optical beams comprising the virtual images, wherein the second and third DOEs operate as an exit pupil expander to provide the output one or more optical beams with expanded pupil relative to the input; and
   a resonant grating filter comprising a doubly-periodic grating microstructure configured to block stray light incident on the non-display side of the waveguide from being scattered by one or more of the DOEs in the exit pupil expander, the stray light being within a predetermined range of wavelengths and angles of incidence and the stray light further being separate from light forming the real images,
   wherein the resonant grating filter is a layer disposed on the non-display side of the waveguide and is distinct from the first, second, and third DOEs.

2. The optical system of claim 1 in which the doubly-periodic grating modulates an effective refractive index for a waveguide through a photonic bandgap effect.

3. The optical system of claim 1 in which the doubly-periodic grating includes grating features with a first sub-period and a second sub-period in which respective periods of the first and second sub-period are non-equal.

4. The optical system of claim 3 in which the first sub-period and second sub-period combine to form an overall super period for the grating features, the grating features providing in-coupling of the stray light into the waveguide, guiding the stray light in the waveguide, and out-coupling the stray light out of the waveguide at the non-display side of the waveguide, wherein the first sub-period and second sub-period are equal to Bragg reflectance periods for the waveguide.

5. The optical system of claim 1 further comprising a second doubly-periodic grating microstructure in which each doubly-periodic grating microstructure is disposed in a separate reflecting layer on the non-display side of the waveguide in the optical system and each reflecting layer is configured to reflect different wavelengths of incident light or each reflecting layer is configured with different angular sensitivity.

\* \* \* \* \*